(12) United States Patent
Okura

(10) Patent No.: US 11,297,397 B2
(45) Date of Patent: Apr. 5, 2022

(54) DIGITAL WATERMARK EMBEDED INTO IMAGES ON SURFACE OF SPORTS BALL AND SYSTEM FOR DETECTING THEREOF

(71) Applicant: Mitsuru Okura, Torrance, CA (US)

(72) Inventor: Mitsuru Okura, Tokyo (JP)

(*) Notice: Subject to any disclaimer, the term of this patent is extended or adjusted under 35 U.S.C. 154(b) by 432 days.

(21) Appl. No.: 16/563,864

(22) Filed: Sep. 7, 2019

(65) Prior Publication Data

US 2021/0076104 A1   Mar. 11, 2021

(51) Int. Cl.
*H04N 21/8358* (2011.01)
*G06T 1/00* (2006.01)
*G06T 7/543* (2017.01)

(52) U.S. Cl.
CPC ....... *H04N 21/8358* (2013.01); *G06T 1/0028* (2013.01); *G06T 7/543* (2017.01); *G06T 2207/30204* (2013.01); *G06T 2207/30224* (2013.01)

(58) Field of Classification Search
None
See application file for complete search history.

(56) References Cited

U.S. PATENT DOCUMENTS

| | | | | |
|---|---|---|---|---|
| 7,680,324 B2 * | 3/2010 | Boncyk | ............... | G06Q 30/0267 382/165 |
| 8,593,054 B2 * | 11/2013 | Hara | ...................... | H01L 27/329 313/503 |
| 8,953,054 B2 | 2/2015 | Blanchflower et al. | | |
| 9,721,389 B2 | 8/2017 | Holmquist | | |
| 10,134,196 B2 * | 11/2018 | Wu | ......................... | G06T 19/006 |
| 2016/0057490 A1 * | 2/2016 | Besehanic | ............... | H04H 60/31 725/19 |

* cited by examiner

*Primary Examiner* — Cai Y Chen
(74) *Attorney, Agent, or Firm* — Baba Patent Agency

(57) ABSTRACT

A system for presenting video signals related to a marker image on a surface of a sports ball structured by a plurality of panels includes a computing device having a camera, and a server linked to the computing device via internet, the server being arranged to store the video signals related to the maker image, wherein programs running on the computing device includes the steps to obtain the maker images captured by the camera, extract a digital watermark embedded from the marker image, the digital watermark being positioned on a part of a curved surface of the plurality of panels formed by sewing, access the server to search the video signals corresponding to information in the digital watermark, receive the video signals from the server; and display the received video signals on the display in the computing device.

6 Claims, 7 Drawing Sheets

DIGITAL WATERMARK EMBEDED INTO IMAGES ON SURFACE OF SPORTS BALL AND SYSTEM FOR DETECTING THEREOF

The present disclosure relates to a sports ball having images of the surface of the sports ball and system for detecting digital watermarks embedded into the images on the surface of the sports ball to display video signals related to the images on a display of the system.

BACKGROUND OF THE INVENTION

Recently, sports ball type albums have become popular that display pictures or photographs of a sports ball, such as a soccer ball. This sports ball type album is not limited to the use only as a display and the photographs for the memory, but also those sports balls can be used for actual soccer play. Further, Services that use digital watermark technologies for inputting information into images by embedding minute changes in brightness of the images and utilizing the embed information to guide users to a specific website or the like based on the information read by a camera of a smartphone have become commonplace.

The digital watermark technology is a technology for embedding digital watermark including necessary information, for example, website information into the images, such as, pictures or photograph (color and black and white photograph) in the degree that human eyes cannot detect minute changes and for extracting the embedded information using specific application software running on a smartphone by capturing the photograph using the camera installed in the smartphone.

The digital watermark is embedded into the images by varying the brightness of the images in the degree that user is difficult to notice of the minute changes. The information included in the watermark can be detected and retrieved using a computer software running on the processor of a computer device, such as, a smartphone after capturing the image by the camera of the smartphone or a mobile phone.

However, the brightness change of the digital watermark embedded in the photograph is noticeable depending on the place where the digital watermark is embedded in the photograph, and there is a problem that the embedded digital watermark is deteriorated due to abrasion or the like in the process of using the ball. When selecting a place in the photograph onto which the digital watermark is embedded, it is necessary to choose the place that is less noticeable. Further it is necessary to embed information so that the image quality does not deteriorate.

OBJECTIVES

An objective of an embodiment of the present invention is to provide a method for printing a marker image including a digital watermark on a surface of sports ball structured by a plurality of panels connected edge to edge by sewing together.

SUMMARY OF THE INVENTION

The forgoing objective of the present invention is accomplished by a system for presenting video signals related to a marker image formed on a surface of a sports ball, the sports ball being structured by a plurality of panels connected edge to edge of the plurality of the panels by sewing together, the system including, a computing device including a processor, a memory for storing machine-readable instructions, a camera for capturing the marker image and a display for displaying the marker image captured by the camera, and a server linked to the computing device via internet, the server being arranged to store the video signals related to the maker image, wherein the machine-readable instructions are to cause the processor to obtain the maker images captured by the camera, extract a digital watermark embedded in the marker image to obtain contents in the digital watermark, the digital watermark being embedded a curved surface of the plurality of panels connected edge to edge of the plurality of panels by sewing together, access to the server according to the contents in the digital watermark, cause the server to search the video signals corresponding to the contents, download the video signals to the computing device, and display the video signals on the display.

It becomes possible to provide a sports ball having images including digital watermark on a surface of a sports ball with less-degradation of sharpness of the digital watermark by embedding at least a part of the watermark on a curved surface of the plurality of panels formed by sewing edge to edge of at least two panels of the plurality of panels the sports ball. Further the place where the watermark is embedded can be a place that is less noticeable because the edge of the panels connected by sewing thread to forms a concave surface toward inside the sports ball.

BRIEF DESCRIPTION OF THE DRAWINGS

The following description includes discussion of figures having illustrations given by way of example of implementation of embodiments of the invention. The drawings should be understood by way of example, and not by way of limitation. As used herein, references to one or more "embodiments" are to be understood as describing a particular feature, structure, or characteristic included in at least "in one embodiment" or "in an alternate embodiment" appearing herein describe various embodiments and implementations of the invention, and do not necessarily all refer to the same embodiments. However, they are also not necessarily mutually exclusive.

DETAILED DESCRIPTION OF THE PREFERRED EMBODIMENT

Reference will now be made in detail to specific embodiments of the disclosure. Example of these embodiments are illustrated in the accompanying drawings. While the disclosure is described in conjunction with these specific embodiments, it will be understood that it is not intended to limit the disclosure to there embodiments. On the contrary, it is intended to cover alternatives, modifications and equivalents as may be included within the sprit and scope of the marker disclosure as defined by the appended claims. In the following description, numerous specific details are set forth in order to provide a thorough understanding of the disclosure. The disclosed embodiments may be practiced without some or all these specific details. In other instances, well known process operations have not been described in detail in order not to unnecessarily obscure the disclosure. The details description is not intended as an extensive or detailed discussion of known concepts, and as such, details that are known generally to those of ordinary skill in the relevant art may have been omitted or may be handled in summary fashion.

Figure 1:
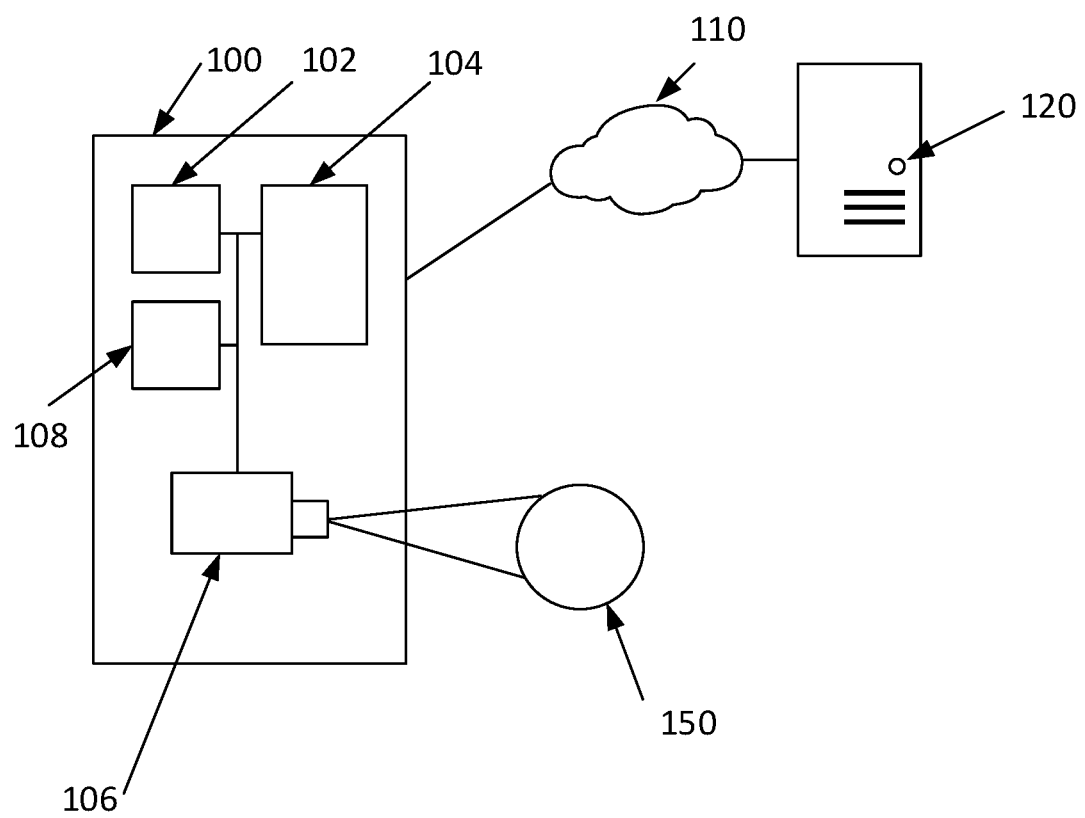
FIG. 1 illustrates a system for detecting a digital watermark embedded into images on a surface of a sports ball, retrieving and displaying the video signals corresponding to the digital watermark stored in a server via internet.

Embodiments of the invention relates to a method for printing a marker image including a digital watermark on a surface of sports ball structured by a plurality of panels connected edge to edge by sewing together to form a round shape of the plurality of panels with less-degradation of sharpness of the digital watermark printed on the round shape as well as a system for detecting the watermark. A digital watermark is a pattern of bits embedded into a digital file, such as image data, audio data or video data. Information included in the watermark usually carries copyright information of the file. In an embodiment of the present invention, the digital watermark embedded in a marker image carries website information which includes information related to the maker images. FIG. 1 illustrates a system for detecting a digital watermark embedded in marker images printed on a surface of a sports ball 150 by capturing a marker image using a camera 106 and, extracting the digital watermark from the marker image. The system is arranged to access server 120 based on the information included in the digital watermark, retrieve video signals related to the marker image, download the video signals the computer device 100 via internet 110 and display the video signals corresponding to the digital marker on the display 108.

The system comprises a computer device 100 including a processor 102, a memory 104 a camera 106 and a display 108, internet 110 which is linked to the computer device 100 and the server 120. Here the computer device 100 is to be so-called a smartphone including a camera 106 and a display 108 for displaying photographs captured by the camera 106 and video signals related to the photograph. The computer device 100 is not limited to a smartphone. The computer device 100 may be a desktop computer or a laptop-computers having a camera and a display thereon.

The processor 102 runs computer programs including machine-readable instructions for causing a user to capture maker images on the surface of the object 150, such as sports balls including soccer balls, rugby balls, American footballs, basket balls, valley balls, baseballs and softballs, to extract digital watermarks embedded into the maker images to obtain information in the digital watermark. Then, the machine readable instructions causes computer device 100 to access the server 120 linked to the internet 110 based on the obtained information and to cause the server 120 to search video signals related to the marker images printed on the surface of the object 150 such as sports balls and to download the searched video signals to the computer device 100 to display the video signals on the display 108 on the computer device 100.

In this embodiment, the sever 120 is arranged to store the video signals related to the maker images printed on the surface of the sports ball 150. The information included in the digital watermark embedded in the digital image printed on the surface of the spots ball 150 is used to access the server 120 and search the video signals related to the marker image stored in the server 120. The video signals are transmitted to the computing device 100 and displayed on the display 108. A photograph includes high-school soccer team members in a certain year, for example. This soccer ball may be memorial balls for the team members. By using this system, team members capture the photograph on the memorial soccer ball using a camera in the smartphone. Then video signals of the final match of the soccer team can be downloaded and displayed on the display in the smartphone.

Figure 2:
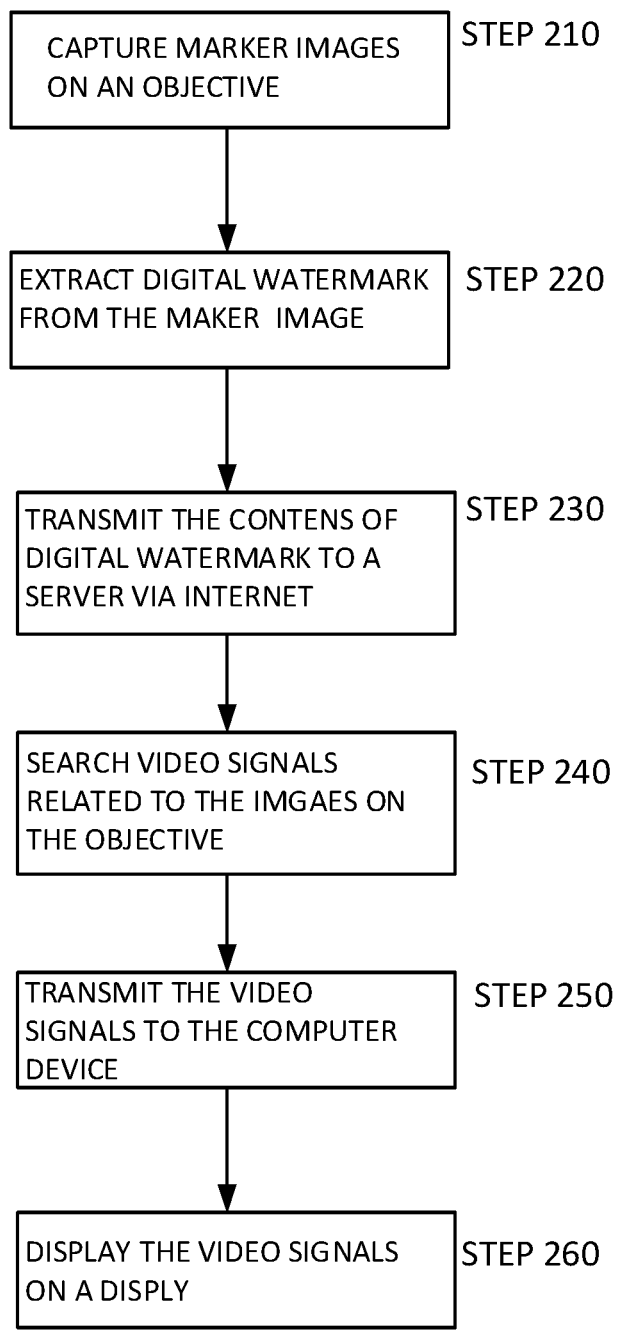
FIG. 2 illustrates a flowchart of machine-readable instructions running on a processor installed in a computing device or a smartphone.

FIG. 2 illustrates a flowchart of machine instructions manuals or programs running on the processor 102 installed in a computing device 100 or a smartphone. As described in previous paragraphs, the computer programs running on the processor 102 is arranged to cause computer device 100 to read out an embedded digital watermark after capturing marker images printed on the surface of the object 150. (STEP 210). Then, the computer programs extract a digital watermark from the captured marker image printed on the surface of the object 150 (STEP 220) and transmit the contents of the extracted digital watermark to the server 120 via internet 110 (STEP 230). When the server 120 receives the contents of the digital water mark, the server 120 starts searching video signals related to the maker images printed on the surface of the sports ball 150 according to the contents of the digital watermark. Then, having searched the video signals related to the marker images, the server 120 transmits the video signals to the computer device 100 (STEP 250). When receiving the video signals from the server 120, the computer programs display the video signals on the display 108 installed int eh computer device 100 (STEP 260).

Figure 3:
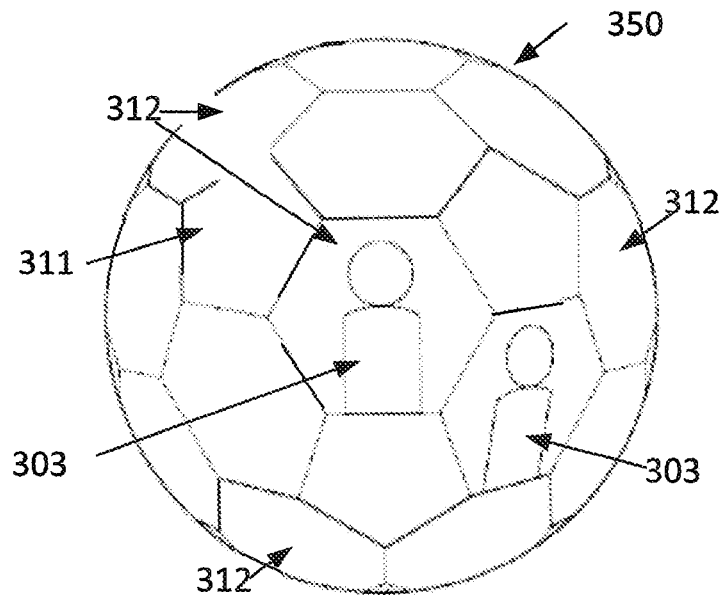
FIG. 3 illustrates a perspective view of a soccer ball structured by a plurality of panels having a photograph thereon.

FIG. 3 illustrates a perspective view of a soccer ball structured by a plurality of panels having a photograph thereon. In this embodiment, a soccer ball 350 is structured by twelve panels having a pentagon shape 311 and twenty panels having a hexagon shape 312. A photograph 303 is printed on the surface of hexagon shape panels 303 as illustrated in FIG. 3 in this embodiment. These panels are made of leather or synthetic leather for covering a bladder having a valve hole. The plurality of panels is connected edge to edge of each panel by machine sewing. The photograph 303 may include images of a person, persons or a landscape. As the digital watermark is embedded into photograph as invisible binary codes in the embodiment, original design of the marker images can be maintained. In this embodiment, the maker image or the photograph includes contents, such as URL (a Uniform Resource Locator) of the server, for example, which stores video signals related to the photograph. The photograph may be a color or a blank and white.

Figure 4:
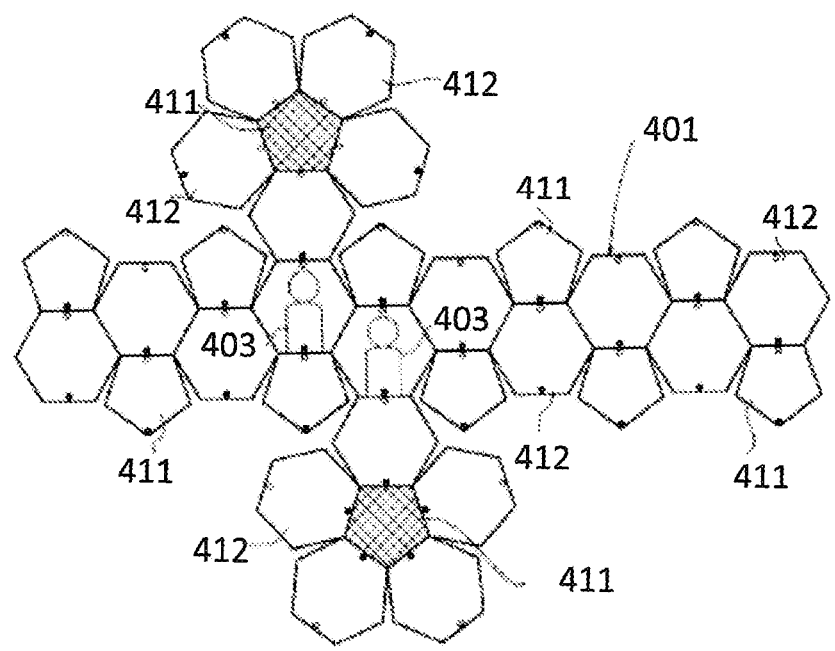
FIG. 4 illustrates a developed view of a plurality of panels, some of the panels being sewn together to form a soccer ball cover.

FIG. 4 illustrates a developed view of a plurality of panels forming a soccer ball illustrated in FIG. 3. Two meshed panels having a pentagon shape show top and bottom portions of the soccer ball shown in FIG. 3. In this embodiment, the photograph is printed within an area of each panel. However, a photograph to be printed on the panel can be extended over the plurality of panels. The digital watermark is embedded into the photograph by varying the brightness of the digital images of the photograph in the degree that user is difficult to notice of the changes. When selecting a place in the photograph onto which the digital watermark is embedded, it is necessary to choose the place that is less noticeable. Further it is necessary to embed the digital watermark so that the image quality of the photograph does not deteriorate, particularly when the object is a sports balls structured by a lot of leather panels connected edge to edge sewed by thread.

Figure 5:
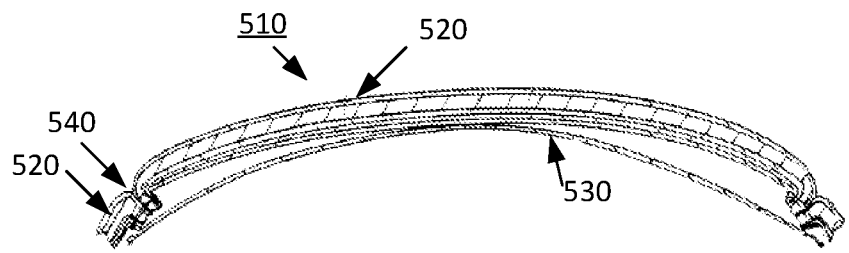
FIG. 5 illustrates a cross sectional view of the soccer ball to show a shape of a curved edge formed between panels structuring a soccer ball.

FIG. 5 illustrates a cross sectional view of a soccer ball 510 to show a concave portion 540 having a curved surface formed between panels 520 structuring a soccer ball. A bladder 530 is covered by the panels 520. When edges of the panels 520 are sewn together by thread, the concave portion 540 having a curved surface is formed along the edges of panels 520. Inventor has found that the concave portion 540 having a curved surface can be suitable for a place where the digital water mark is placed in the photograph to be printed on the surface of the panels 520. Because due to the curved surface formed by the edges of panels sewn together by the thread, the brightness or contrast change of the digital watermark in the photograph is less noticeable than that of the digital watermark in photograph printed on the flat surface of the panels 520. Further, since the surface of the edge portion of the panels become hollow toward inside of the soccer ball, the embedded digital watermark positioned on the concave portion 540 formed between edges of the panels 520 can be further protected from frictions and scratches occurred when the soccer ball 510 is used.

Example 1

Figure 6A:
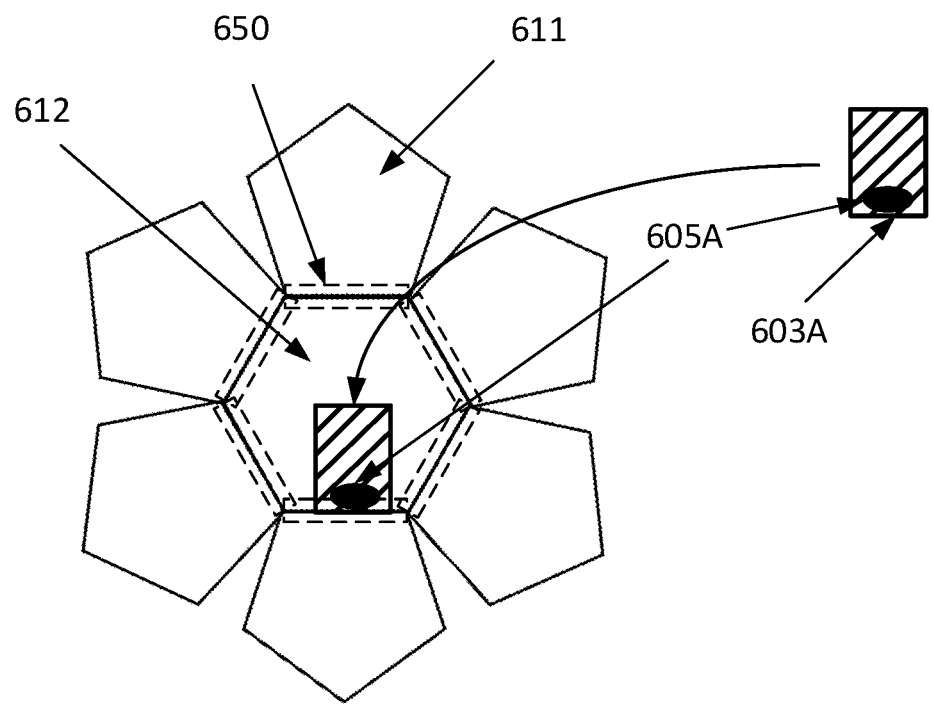
FIG. 6A illustrates a developed view of a plurality of panels forming a soccer ball. A photograph is printed on a curved edge of a surface of a hexagonal panel being one of the plurality of panels.

FIG. 6A illustrates a developed view of a plurality of panels including a pentagon shape panel 611 and a hexagon shape panel 612 forming a soccer ball. A concave portion 650 is formed between edges of panels 611 and 612 along with both edges of the panels. A photograph 603A is printed on a surface of a hexagonal panel 612 being one of the plurality of panels. In this embodiment, a part of digital watermark 605A embedded in the photograph 603A is placed in the concave portion 650 being formed between edges of panels 611 and 612 as illustrated in FIG. 6A. Of course, the entire portion of the digital watermark 605A embedded in the photograph 603A can be positioned in the concave portion 650 being formed between edges of panels 611 and 612. Further, if a part of or entire portion of the digital watermark 605A falls in the concave portion 650, minute changes of the brightness of the photograph are less noticeable and the digital watermark can be further protected from scratches and friction when the ball is used.

Example 2

Figure 6B:
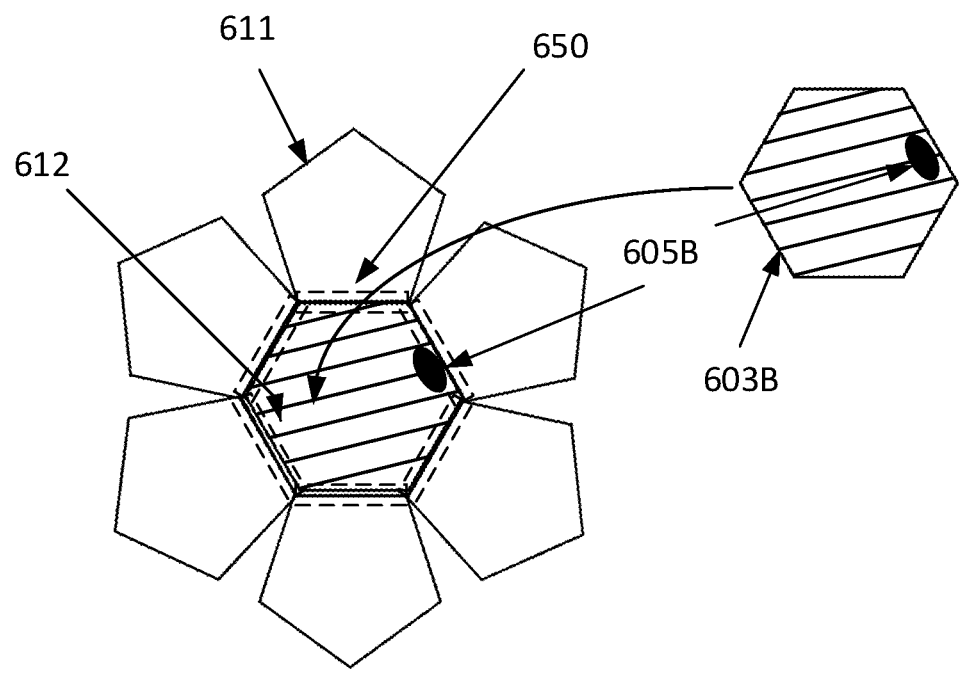
FIG. 6B illustrates a developed view of a plurality of panels forming a soccer ball. A photograph is printed over the entire surface of a hexagonal panel and a part of a digital watermark embedded in the photograph is placed on a curved edge of the plurality of panels.

FIG. 6B illustrates a developed view of a plurality of panels including a pentagon shape panel 611 and a hexagon shape panel 612 forming a soccer ball. A concave portion 650 is formed between edges of panels 611 and 612 along with both edges of the panels. A photograph 603B is printed over the entire surface of a hexagonal panel 612 being one of the plurality of panels. In this embodiment, a part of digital watermark 605B embedded in the photograph 603B is placed in the concave portion 650 being formed between edges of panels 611 and 612 as illustrated in FIG. 6B. Of course, the entire portion of the digital watermark 605B embedded in the photograph 603B can be positioned within the concave portion 650 being formed between edges of panels 611 and 612. The same as EXAMPLE 1, as long as a part of or entire portion of the digital watermark 605B falls in the concave portion 650, the minute changes of the brightness of the photograph is less noticeable and the digital watermark can be further protected from scratches and friction when the ball is used.

Example 3

Figure 6C:
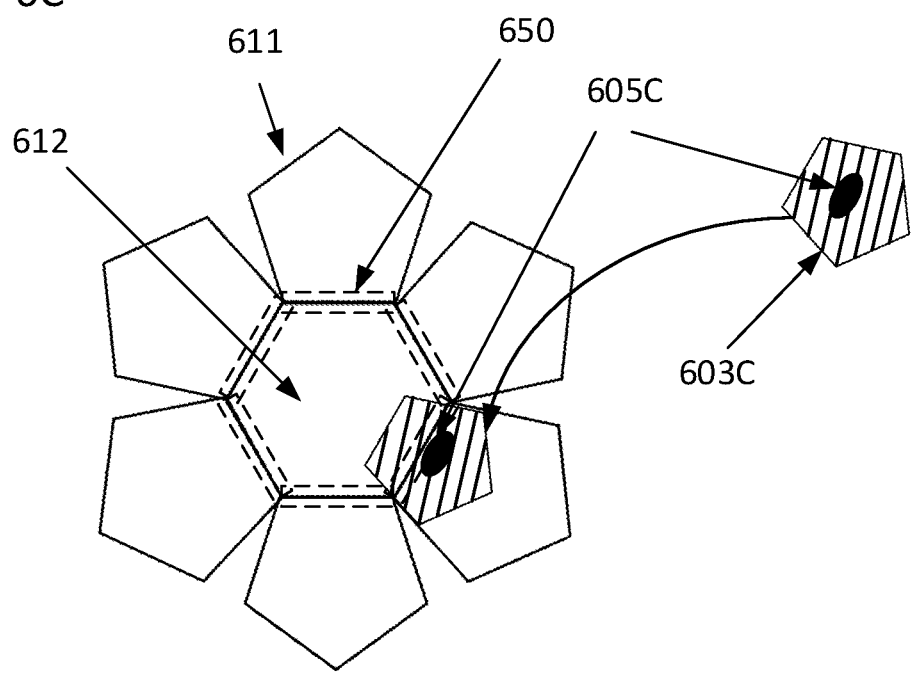
FIG. 6C illustrates a developed view of a plurality of panels forming a soccer ball. A photograph is printed across the curved edge of the plurality of panels and the digital watermark embedded in the photograph is placed on a curved edge of the plurality of panels.

FIG. 6C illustrates a developed view of a plurality of panels including a pentagon shape panel 611 and a hexagon shape panel 612 forming a soccer ball. A concave portion 650 is formed between edges of panels 611 and 612 along with both edges of the panels. A photograph 603C is printed across the concave portion 650 being formed between edges of panels 611 and 612 as illustrated in FIG. 6C. In this embodiment, a part of digital watermark 605C embedded in the photograph 603C is placed in the concave portion 650 being formed between edges of panels 611 and 612. Of course, the entire portion of the digital watermark 605C embedded in the photograph 603C can be positioned within the concave portion 650 being formed between edges of panels 611 and 612. The same as EXAMPLES 1 and 2, as long as a part of or an entire portion of the digital watermark 605C falls in the concave portion 650, the minute changes of the brightness of the photograph are less noticeable and the digital watermark can be further protected from scratches and friction when the ball is used.

Example 4

In EXAMPLES 1, 2 and 3, a soccer ball is used to described how to embed the digital water mark on the plurality of panels forming the soccer ball. However, embodiments of the present invention are not limited to the soccer ball. The digital water mark in the photograph discussed above can be embedded on the surface(s) of a baseball and a softball formed by two panels, a basketball formed by six panels, and a rugby-ball and an American football formed by four panels.

Figure 7:
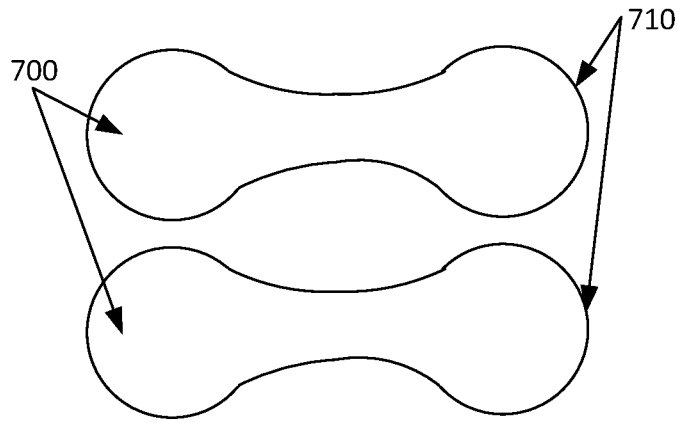
FIG. 7 illustrates a shape of two panels forming a softball cover to which a photograph can be printed thereon.

FIG. 7 illustrates two panels 700 forming a baseball and soft ball to which a photograph can be printed. The concave portion illustrated in FIGS. 6A, 6B and 6C is not illustrated in FIG. 7. However, the concave portion is formed between edges of the panels 700 when both edges are sewn together by thread as described in previous embodiments. The edges of the panels 710 are sewn together to form a baseball and a softball. As described previously, a part of digital watermark or an entire digital watermark in the photograph to be printed on the surface of panel 700 embedded is placed in the concave portion being formed between edges of panels 710 as described in EXAMPLES 1, 2 and 3.

Example 5

Figure 8:
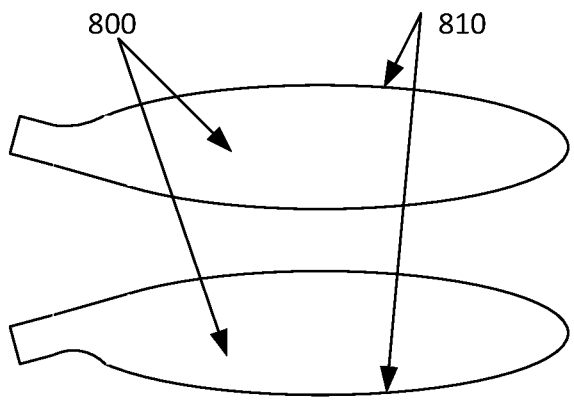
FIG. 8 illustrates two panels which structures a basketball cover together with other four panels.

FIG. 8 illustrates two panels out of six panels which structure a basketball. In the case of basketball, photographs can be printed on two panels out of six panels. The concave portion illustrated in FIGS. 6A, 6B and 6C is not illustrated in FIG. 8. However, the concave portion is formed between edges of the panels 800 when both edges are sewn together by thread as described in previous embodiments. The edges of the panels 810 are sewn together to form a baseball and a softball. As described previously, a part of digital watermark or an entire digital watermark in the photograph to be printed on the surface of panel 800 embedded is placed in the concave portion being formed between edges of panels 810 as described in EXAMPLES 1, 2 and 3.

Example 6

Figure 9:
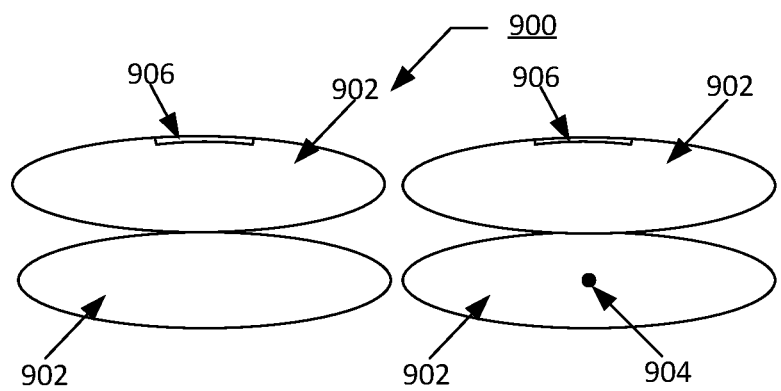
FIG. 9 illustrates four panels which structure a football cover.

FIG. 9 illustrates four panels 902 which structures a football 900. The concave portion illustrated in FIGS. 6A, 6B and 6C is not illustrated in FIG. 9. However, the concave portion is formed between edges of the panels 902 when both edges are sewn together by thread as described in previous embodiments. The edges of the panels 902 are sewn together to form a football including a rugby ball and an American football. As described previously, a part of digital watermark or an entire digital watermark in the photograph to be printed on the surface of panel 902 is placed in the concave portion being formed between edges of panels 902 as described in EXAMPLES 1, 2 and 3. In FIG. 9, an air valve 904 and a sawing thread portion 906 are illustrated.

Example 7

Figure 10:
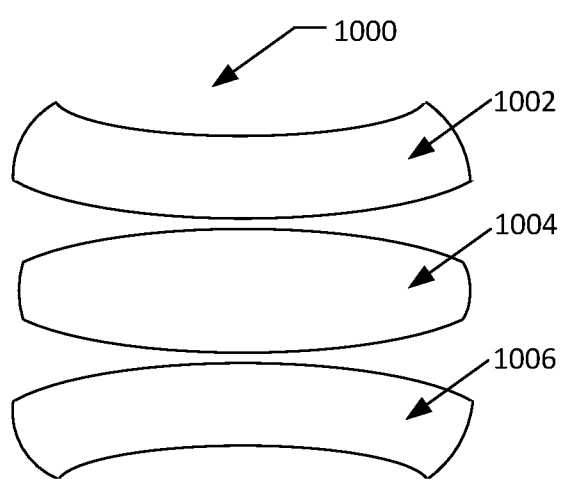
FIG. 10 illustrates three panels which structure a volleyball cover.

FIG. 10 illustrates three panels 1002, 1004 and 1005 which structure a volleyball 1000. The concave portion illustrated in FIGS. 6A, 6B and 6C is not illustrated in FIG. 10. However, the concave portion is formed between edges of the panels 1002, 1004 and 1006 and other portion of the ball when both edges are sewn together by thread as described in previous embodiments. The edges of the panels 1002, 1004 and 1006 are sewn together to form volleyball. As described previously, a part of digital watermark or an entire digital watermark in the photograph to be printed on the surface of panel 1002, 1004 and 1006 embedded is placed in the concave portion being formed between edges of panels 1002, 1004 and 1006 as described in EXAMPLES 1, 2 and 3. The plurality of panels described above embodiments are made of leather or synthesized leather. In this embodiment, photographs can be printed onto two panels out of three panels 1002, 1004 and 1006.

Figure 11:
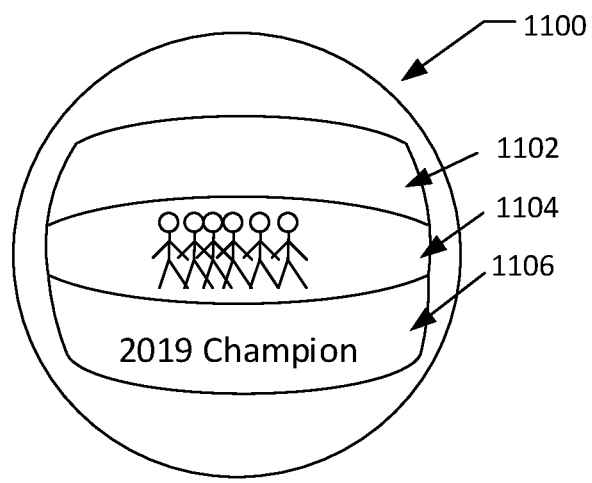
FIG. 11 an example of a volleyball including panels onto which a picture is printed thereon.

FIG. 11 an example of a volleyball 1100 including panels 1102, 1104 and 1106 onto which pictures are printed. In this embodiment, photographs can be printed on two panels out of three panels 1102, 1104 and 1106. A part or an entire digital watermark is placed on the concave portion formed between edges of the panels when both edges are sewn together by thread as described in previous embodiments.

As described in EXAMPLES above, it becomes possible to provide a sports ball having images including a digital watermark on a surface of a sports ball with less-degradation of sharpness of the digital watermark by embedding at least a part of the watermark on a curved surface of the plurality of panels formed by sewing edge to edge of at least two panels of the plurality of panels the sports ball. Further the place where the digital watermark is embedded can be a place that is less noticeable because the edge of the panels connected by sewing thread to forms a concave surface toward inside the sports ball.

What is claimed is:

1. A system for presenting video signals related to a marker image the system comprising:
   a computing device including a processor, a memory for storing machine-readable instructions, a camera for capturing the marker image and a display for displaying the marker image captured by the camera; and
   a server linked to the computing device via internet, the server being arranged to store the video signals related to the maker image,
   wherein the marker image formed on a surface of a sports ball, the sports ball being structured by a plurality of panels connected edge to edge of the plurality of panels by sewing together;
   wherein the machine-readable instructions are to cause the processor to obtain the maker images captured by the camera;
   extract a digital watermark embedded in the marker image to obtain contents in the digital watermark, the digital watermark being embedded on a part of a curved surface of the plurality of panels;
   access to the server according to the contents in the digital watermark;
   cause the server to search the video signals corresponding to the contents;
   download the video signals to the computing device; and display the video signals on the display.

2. The system for presenting video signals related to a marker image formed on a surface of a sports ball according to claim 1, wherein the marker image is formed by a photograph.

3. The system for presenting video signals related to a marker image formed on a surface of a sport ball according to claim 2, wherein the photograph is formed by a photograph consisting the group of black and white photograph and a color photograph.

4. The system for presenting video signals related to a marker image formed on a surface of a sports ball according to claim 1, wherein the plurality of panels is formed by a pentagon and a hexagon.

5. The system for presenting video signals related to a marker image formed on a surface of a sports ball according to claim 1, wherein the plurality of panels is formed by a panel shaped in curved line.

6. The system for presenting video signals related to a marker image formed on a surface of a sports ball according to claim 1, wherein the sports ball is consisting the group of a baseball, a softball, a basketball, a rugby ball and an American football.

* * * * *